United States Patent [19]

Thomson

[11] 4,157,411
[45] Jun. 5, 1979

[54] CONNECTOR ARRANGEMENT FOR CROSS-STRANDED NETTING

[76] Inventor: Walter G. Thomson, 8801 Shiro Rd., Hitchcock, Tex. 77563

[21] Appl. No.: 886,466

[22] Filed: Mar. 14, 1978

[51] Int. Cl.² .......................... B21F 27/08; B32B 5/02
[52] U.S. Cl. ..................................... 428/107; 140/10; 140/11; 428/255; 428/256
[58] Field of Search .................................. 140/10, 11; 264/DIG. 81; 428/107, 255, 256

[56] References Cited

U.S. PATENT DOCUMENTS

| | | | |
|---|---|---|---|
| 526,311 | 9/1894 | Harris | 140/10 |
| 827,365 | 7/1906 | Harris | 140/10 |
| 1,552,269 | 9/1925 | Brocker | 140/11 |
| 1,817,519 | 8/1931 | Mandalian | 428/256 |
| 2,111,775 | 3/1938 | Hanson | 140/11 |
| 2,825,168 | 3/1958 | Ekman | 428/255 |
| 3,376,001 | 4/1968 | Wilme | 140/11 |
| 3,501,366 | 3/1970 | Bramley et al. | 428/107 |
| 3,733,243 | 5/1973 | Crawford | 428/107 |
| 3,950,584 | 4/1976 | Bramley | 264/DIG. 81 |
| 4,000,344 | 12/1976 | Dibley | 428/255 |

FOREIGN PATENT DOCUMENTS 101149  5/1937  Australia .................................... 140/11

*Primary Examiner*—J. C. Cannon
*Attorney, Agent, or Firm*—B. P. Fishburne, Jr.

[57] ABSTRACT

Nets or netting for fishing and for other purposes are fabricated without the customary laborious, time-consuming and costly hand knotting procedure and without the requirement for skill. The fabricating procedure can be automated for greater efficiency. The crossing strands which are to form the netting are connected at their points of crossing by crimped metal elements which lock the crossing strands against displacement in any direction. The crimped metal elements may be employed alone or in conjunction with an adhesive mass further bonding and locking the crossing net strands. In a variant, the strands are looped around the crimped metal elements for further security. The strands may also be knotted adjacent to their crossing points with the knots contained in an adhesive mass and further held by crimped metal strips.

2 Claims, 7 Drawing Figures

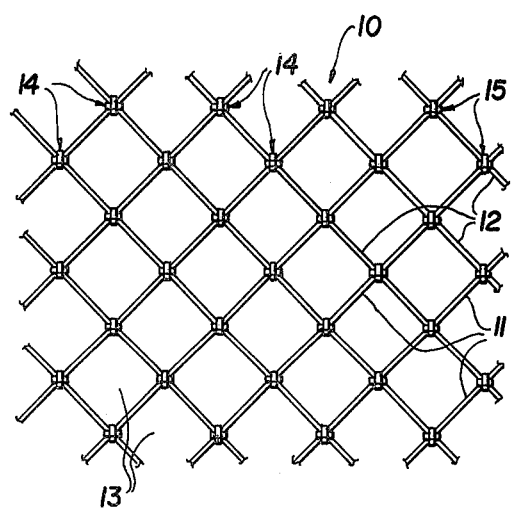
FIG.1
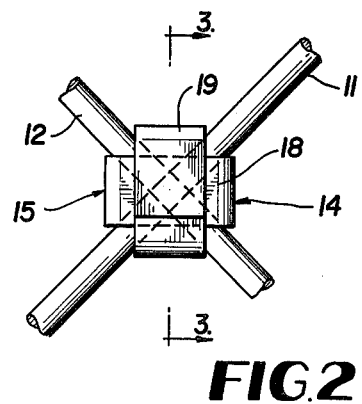
FIG.2
FIG.3
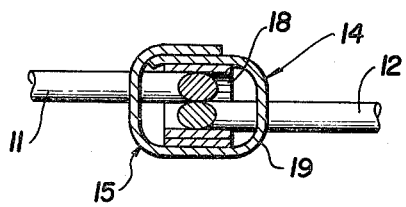
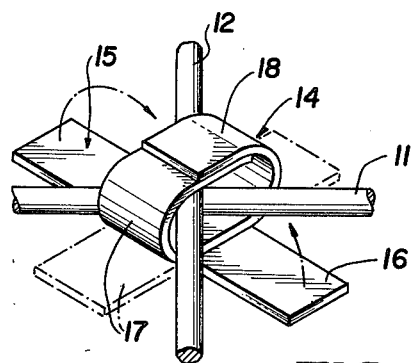
FIG.4
FIG.5
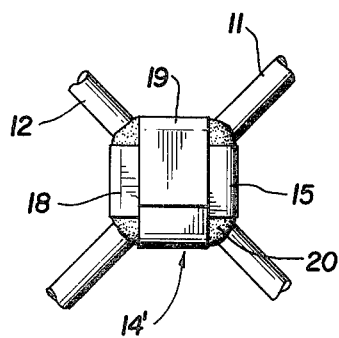
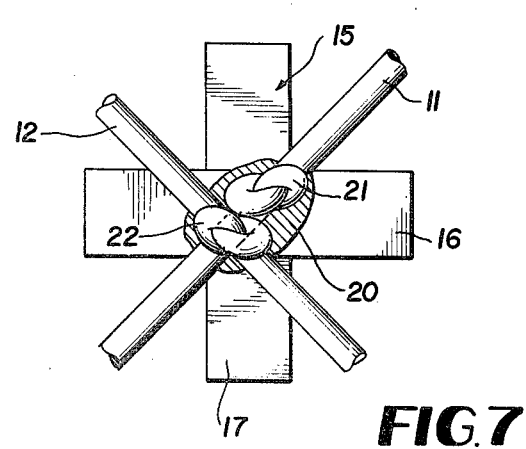
FIG.6
FIG.7

CONNECTOR ARRANGEMENT FOR CROSS-STRANDED NETTING

BACKGROUND OF THE INVENTION

Net making by fishermen is an ancient art which involves laborious and time-consuming hand methods of knotting and interlocking the net strands. Simple hand shuttles and gage bars are employed by net makers during the production of fishing nets and the like from twine. A modern disclosure of the traditional procedure is contained on pages 27 to 32 of the May, 1975 edition of "Texas Fisherman" in an article entitled "How to Make Fishing Nets" by Anton Husak.

To comply with the duty to disclose pertinent prior art under 37 C.F.R. 1.56, the following U.S. Pat. Nos. are also made of record herein: 2,590,586, 3,111,060, 2,817,263, 3,170,611, 2,870,669, 3,322,021.

The objective of this invention is to improve on the prior art by the provision of a net or netting which is fabricated either manually or with the assistance of machinery in a much less time-consuming and therefore much more economical manner and without the need for substantial skill. The netting embodying the invention in any one of several variations is strong and uniform as to quality and construction and is suitable for use in fishing nets and for many other applications where the traditional netting is used. On a production basis, the cost of netting under this invention will be much less than under the prior art.

Other features and advantages of the invention will become apparent during the course of the following detailed description.

BRIEF DESCRIPTION OF THE DRAWINGS

FIG. 1 is a fragmentary plan view of netting constructed in accordance with the invention.

FIG. 2 is an enlarged fragmentary plan view of crossing net strands and attaching means according to one embodiment of the invention.

FIG. 3 is a vertical section taken on line 3—3 of FIG. 2.

FIG. 4 is a fragmentary perspective view showing the process of joining the crossing net strands by crimped metal elements in accordance with FIGS. 2 and 3.

FIG. 5 is a fragmentary view similar to FIG. 2 showing a variant of the invention.

FIG. 6 is a further view, similar to FIG. 2, partly in cross section, showing another variant.

FIG. 7 is a fragmentary plan view showing still another variant.

DETAILED DESCRIPTION

Referring to the drawings in detail wherein like numerals designate like parts, there is shown in FIG. 1 a section of netting 10 having right angular crossing strands 11 and 12 of twine or the like, such as used in the construction of fishing nets or other like articles. As illustrated, the crossing strands 11 and 12 form a gridwork having substantially equally sized square spaces defined by the strands of the netting. The sizes and shapes of these netting spaces 13 may be varied in practice to meet particular needs.

In lieu of the traditional hand knotting of the prior art to connect the strands 11 and 12 at their intersecting and crossing points, such connections are made in a much more expeditious and less laborious manner and with greater economy, according to one preferred embodiment of the invention shown in FIGS. 1—4.

In these figures, each identical netting strand connection 14 is formed by a crimped metal element or connector 15 which is initially flat, FIG. 4, and cruciform prior to bending or crimping. The cruciform element 15 may be blanked from a single section of metal or may, if preferred, consist of two separate crossing metal strips prior to crimping.

In any case, each flat connector element 15 is placed directly beneath the intersection point of each pair of strands 11 and 12 with the crossing arms 16 and 17 of the connector diagonally disposed or substantially at 45 degrees to the strands 11 and 12. This places the opposite end portions of the arms 16 and 17 midway between each right angular pair of strands 11 and 12.

Following such positioning of the connector 15 relative to the crossing net strands, the end portions of one connector arm 17 are formed into a loop 18 around the strand crossing point with the ends of the loop overlapping, FIG. 4, and following this, the second arm 16 is formed into a similar loop 19 at right angles to and over the loop 18, FIGS. 2 and 3, with the ends of this second loop overlapping, as shown in FIG. 3. Pressure can then be applied to the top and bottom of the resulting double loop cruciform connection 14 with a suitable plier-type tool to firmly crimp the connector in place grippingly with the strands 11 and 12 so that they will be held firmly in place without slippage during the use of the netting. The two loops 18 and 19, FIG. 2, which cross at right angles, are interlocked between adjacent right angular net strands, as clearly illustrated.

The above-described operations for applying the connector elements 15 may be manual or may be accomplished with automation under existing technology, not shown. The strand connections 14 are just as effective as the traditional knotting arrangement and much more practical and economical from a manufacturing point of view.

As a first variant of the invention, FIG. 5, the identical crimped connector element 15 consisting of crossing loops 18 and 19 is employed, but prior to forming the two loops 18 and 19 and while the element 15 is still flat, a mass of settable adhesive 20 is placed on the intersection of the strands 11 and 12 to embed or encompass such intersection, for the purpose of adhesively bonding the strands to each other and bonding them to the connector element 15 which is subsequently formed or crimped in the described manner to complete a net strand connection 14'.

FIG. 6 shows another variant or modification of the invention, again utilizing the indentical cruciform crimped connector element 15 without adhesive, but with the added feature of wrapping or looping one strand 12 around the connector loop 19 as at 12', and similarly looping the other strand 11 around the opposite side of the loop 19 as at 11'. This further locks the two crossing strands to the crimped connector with added security. If desired, the loops 12' and 11' could be formed about the connector loop or portion 18 rather than the loop 19.

FIG. 7 shows another variant of the invention in which the same initially flat cruciform connector 15 is utilized in conjunction with a mass of adhesive 20 enclosing the intersection of the net strands 11 and 12. In addition, the two strands are knotted at 21 and 22 as close as possible to the strand crossing point and the adhesive mass 20 encloses the knots substantially. The arms 16 and 17 of the connector 15 are then looped and crimped to complete the connection in the same manner previously described. Still other variations, not shown, are possible within the invention.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A net structure comprising multiple substantially right angular crossing flexible net strands forming a rectangular net gridwork, formable sheet metal connectors for said strands at all of their crossing points, each connector being cruciform and including right angular arms which are arranged diagonally of the crossing strands and with the arms folded across said crossing points so as to clampingly embrace the strands at the crossing points on opposite faces of the net structure, the folded arms of said connectors being disposed symmetrically between adjacent right angular sections of the crossing net strands and one net strand of each crossing pair pg,9 of strands being looped once about one of said folded arms and then continuing to pass diagonally through the connector, the strand loops thus formed being disposed on opposite sides of each connector to collectively form substantially a figure-8 loop configuration.

2. A net structure as defined in claim 1, and a settable adhesive mass enveloping the crossing point of each crossing pair of net strands within each formed sheet metal connector and bonding the strands to each other and to the connector.

* * * * *